(12) United States Patent
Kitaura et al.

(10) Patent No.: US 6,768,710 B2
(45) Date of Patent: Jul. 27, 2004

(54) OPTICAL INFORMATION RECORDING MEDIUM, METHOD FOR PRODUCING THE SAME, AND METHOD AND APPARATUS FOR RECORDING INFORMATION THEREON

(75) Inventors: Hideki Kitaura, Kyoto (JP); Noboru Yamada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 307 days.

(21) Appl. No.: 10/023,316

(22) Filed: Dec. 14, 2001

(65) Prior Publication Data

US 2002/0122366 A1 Sep. 5, 2002

(30) Foreign Application Priority Data

Dec. 18, 2000 (JP) ........................................ 2000-383346

(51) Int. Cl.[7] ................................................. G11B 7/00
(52) U.S. Cl. ................... 369/100; 369/275.1; 428/64.1; 430/270.13
(58) Field of Search ............................... 369/53.3, 53.1, 369/47.1, 47.5, 59.1, 100, 275.1, 275.2, 275.3, 275.4, 275.5, 272; 428/64.1, 64.5; 430/270.13, 270.1, 270.12, 290, 964

(56) References Cited

U.S. PATENT DOCUMENTS

| | | | | |
|---|---|---|---|---|
| 3,971,874 A | * | 7/1976 | Ohta et al. | |
| 4,587,209 A | * | 5/1986 | Ohno et al. | |
| 4,624,914 A | * | 11/1986 | Kimura et al. | |
| 5,424,106 A | * | 6/1995 | Yamada et al. | ............ 428/64.6 |
| 5,764,619 A | * | 6/1998 | Nishiuchi et al. | |
| 6,229,785 B1 | * | 5/2001 | Kitaura et al. | |

FOREIGN PATENT DOCUMENTS

| | | | |
|---|---|---|---|
| EP | 0 720 159 A2 | * | 7/1996 |
| EP | 0 957 477 A2 | * | 11/1999 |
| JP | 50-46317 | * | 4/1975 |
| JP | 60-203490 | * | 10/1985 |
| JP | 61-68296 | * | 4/1986 |
| JP | 62-88152 | * | 4/1987 |
| JP | 9-212917 | * | 8/1997 |
| JP | 9-326135 | * | 12/1997 |
| JP | 10-505188 | * | 5/1998 |
| JP | 2000-36130 | * | 2/2000 |
| WO | WO 98/09823 | * | 3/1998 |

* cited by examiner

Primary Examiner—Muhammad Edun
(74) Attorney, Agent, or Firm—Merchant & Gould P.C.

(57) ABSTRACT

The present invention provides a write-once optical information recording medium that can achieve a high reflectance and favorable recording and reproducing characteristics such that a high C/N ratio and high sensitivity even when information is recorded/reproduced with high density. This medium includes a transparent substrate and at least one information layer formed on the substrate. The information layer includes a recording layer made of a material including Te, O and M, where M is at least one element selected from the group consisting of Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi. A reflectance with respect to a light beam incident from the side of the transparent substrate after recording information on the recording layer is lower than a reflectance before recording.

23 Claims, 4 Drawing Sheets

— ● — Configuration A
— ○ — Configuration B
— △ — Configuration C
— □ — Configuration D

OPTICAL INFORMATION RECORDING MEDIUM, METHOD FOR PRODUCING THE SAME, AND METHOD AND APPARATUS FOR RECORDING INFORMATION THEREON

BACKGROUND OF THE INVENTION

1. Field of the Invention

The present invention relates to a write-once optical information recording medium capable of recording and reproducing information signals with high signal quality by irradiating a thin film formed on a substrate with a high energy light beam such as a laser beam, a method for producing the same, and a method and an apparatus for recording information thereon.

2. Description of the Related Art

A recording medium is known that allows information to be recorded and reproduced by irradiating a thin film formed on a transparent substrate with a laser beam focused on a tiny spot. As a write-once recording medium, a recording medium is known that includes a substrate and a recording thin film of TeOx (0<x<2), which is a mixture of Te and $TeO_2$, formed on the substrate (JP 50(1975)-46317 A). This recording medium can provide a larger change in reflectance by irradiation of a light beam for reproduction.

The TeOx recording thin film is produced in the amorphous state and can form a crystalline recording mark by laser beam irradiation, thus eliminating an initialization process such as laser annealing. This is an irreversible process that makes it impossible to modify or erase information by overwriting. Therefore, a recording medium including the above recording thin film can be utilized as a write-once recording medium. The recording thin film does not require a dielectric protective layer or the like because of its high durability, such as high resistance to humidity. To reduce the manufacturing cost, the TeOx recording thin film is used as a single-layer film.

For the TeOx recording thin film, it takes some time until a signal is saturated after recording, i.e., crystallization in the recording thin film caused by laser beam irradiation proceeds sufficiently. Therefore, basically, the recording medium including such a recording thin film is unsuitable as a recording medium that needs to provide high-speed response, e.g., a data file for computers, in which data are recorded on a disk and then examined after the disk makes one revolution. To overcome this disadvantage, the addition of Pd and Au to TeOx as third elements has been proposed (JP 60(1985)-203490 A, JP 61(1986)-68296 A, and JP 62(1982)-88152 A).

Pd and Au are considered to accelerate the growth of crystals in a TeOx thin film when the film is irradiated with a laser beam. This allows crystal grains of Te and Te Pd alloy or Te Au alloy to grow rapidly. Pd and Au have high oxidation resistance, and thus they do not degrade the superior humidity resistance of the TeOx thin film.

As a basic means for increasing the amount of information stored per recording medium, the following is known: the spot size of a laser beam is reduced by using the laser beam having a shorter wavelength and an objective lens having a greater numerical aperture for focusing the laser beam. Also, mark edge recording or land and groove recording has been introduced. Moreover, a multi-layer structure in which a plurality of information layers are stacked has been proposed, and a layer recognition means and a layer switching means for selecting one of those information layers of the multi-layer structure also have been proposed.

To achieve high-density recording described above, the composition of a recording material containing TeOx and the additives of Pd and Au as the third elements, and a recording medium with an improved thickness have been proposed as well (JP 9(1998)-326135 A, WO 98/09823).

In general, it is necessary that a recording medium should have at least a certain predetermined reflectance before recording to perform servo control such as focusing or tracking. For a reflectance-increase-type medium, whose reflectance after recording is higher than that before recording, the reflectance is increased further after recording. Therefore, in this medium, either one of the reflectances before and after recording cannot be close to zero, which leads to a disadvantage in providing larger signal contrast. On the other hand, a reflectance-decrease-type medium can reduce the reflectance after recording while keeping the reflectance before recording high. Therefore, it is preferable in terms of servo control and also has the advantage of providing larger signal contrast.

However, every conventional recording medium including a TeOx recording thin film is a reflectance-increase type, whose reflectance after recording is higher than that before recording.

SUMMARY OF THE INVENTION

So far no consideration has been given to produce a reflectance-decrease-type recording medium including a TeOx recording thin film. This is probably caused by the fact that TeOx is a reflectance-increase-type material, i.e., a material whose reflectance increases with crystallization, even if the composition or thickness is changed. However, the present invention provides a reflectance-decrease-type recording medium including the TeOx recording thin film.

A recording medium of the present invention includes a transparent substrate and at least one information layer formed on the transparent substrate. The information layer includes a recording layer made of a material that includes Te, O and M, where M is at least one element selected from the group consisting of Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi. A reflectance with respect to a light beam incident from the side of the transparent substrate after recording information on the recording layer is lower than a reflectance before recording.

A reflectance-decrease-type recording medium including the above recording thin film can be provided, e.g., by adding at least one reflectance adjustment layer to the information layer. Examples of the reflectance adjustment layer include a reflective layer and a dielectric layer, which will be described later. In the absence of the reflectance adjustment layer, a reflectance after recording information on the recording layer is typically higher than that before recording. However, the presence of the reflectance adjustment layer allows reflections from the medium to be adjusted due to the optical interference effect, so that a reflectance after recording is lower than that before recording. The reflectance adjustment layer can be a single layer or composed of a plurality of sub-layers.

The present invention further provides a method for producing the above recording medium, a recording method, and a recording apparatus. In an embodiment of a method for producing the recording medium of the present invention, an information layer is formed on a protective substrate, and then a transparent substrate is formed on the information layer. The method for providing the information layer on the protective layer as described above is suitable, e.g., for a thin transparent substrate having a thickness of not more than 0.4 mm.

In another embodiment of a method for producing the recording medium of the present invention, an annealing process is performed at a temperature of not less than 60° C. for not less than five minutes after forming at least the recording layer. This method can provide a higher C/N ratio.

The recording method of the present invention includes recording information on a recording medium that moves relative to a light beam by irradiating the recording medium with the light beam from the side of the transparent substrate while modulating the light beam between a peak power and a smaller power than the peak power so as to form a recording mark. The product VT of a linear velocity V of the recording medium with respect to the light beam and a time T to maintain the light beam for irradiation at the peak power is determined, and the time T is set so that the product VT increases with an increase in the linear velocity V in terms of unit length of the recording mark.

The recording apparatus of the present invention includes the following: a rotation means for rotating the recording medium; an irradiation means for irradiating the recording medium that is rotated by the rotation means with a light beam to form a recording mark; and a modulation means for modulating the light beam emitted from the irradiation means between a peak power and a smaller power than the peak power. The product VT of a linear velocity V of the recording medium with respect to the light beam and a time T to maintain the light beam for irradiation at the peak power is determined, and the modulation means sets the time T so that the product VT increases with an increase in the linear velocity V in terms of unit length of the recording mark.

The thermal interference between the recording marks decreases with an increase in the linear velocity of the medium. Consequently, when the recording marks are formed to have the same length in the same period of time of irradiation of peak power, the recording marks become smaller as the linear velocity increases. According to the recording method and apparatus of the present invention, the irradiation time T is set so that the product VT of the linear velocity V of the recording medium and the irradiation time T of peak power is increased with an increase in the linear velocity V in terms of unit length of the recording mark to be recorded. This makes it possible to compensate the difference in size of the recording marks.

DESCRIPTION OF THE PREFERRED EMBODIMENTS

Figure 1:
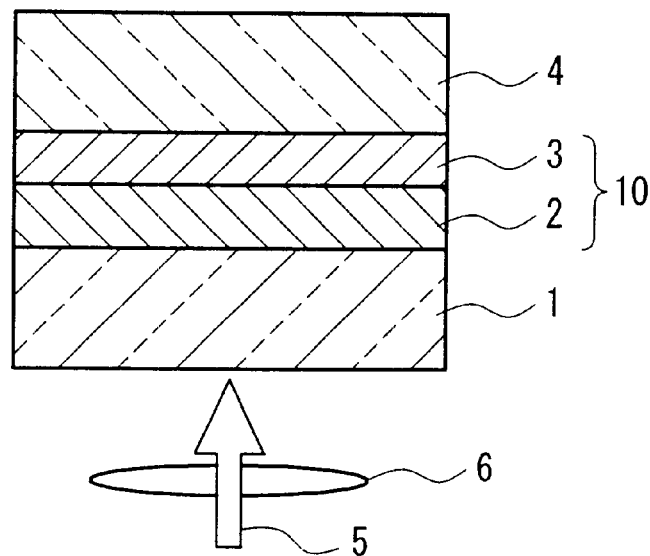
FIG. 1 is a cross-sectional view showing an example of the configuration of an optical information recording medium of the present invention.

Hereinafter, a preferred embodiment of the present invention will be described.

So far no consideration has been given to produce a reflectance-decrease-type medium including a TeOx recording thin film and no one has pointed out the possibility as well. However, the present inventors have determined that there are some conditions under which the characteristics of a medium including an inherently reflectance-increase-type recording thin film can be changed. As a result, the inventors have confirmed that a high C/N ratio and high sensitivity can be achieved while maintaining a high reflectance even when information is recorded/reproduced with high density.

In a preferred embodiment of the present invention, an information layer (an information multi-layer) includes a reflective layer on the side opposed to a transparent substrate with respect to a recording layer. It is preferable that the reflective layer is made of a material having a refractive index n of not more than 3 or an extinction coefficient k of not less than 1, particularly n being not more than 2.0 or k being not less than 2.0. It is more preferable that the reflective layer meets the conditions of n and k at the same time, and in such a case, e.g., n is not more than 3 and k is not less than 1. The preferred thickness of the reflective layer is in the range of 5 nm to 200 nm.

When the reflective layer is provided, it is preferable that the information layer further includes a dielectric layer that is deposited at least at one of the position between the recording layer and the reflective layer and the position between the transparent substrate and the recording layer. The dielectric layer is made of a material having a refractive index n of not less than 1.5 and has a thickness of 0.01 λ/n to 0.3 λ/n. In this specification, λ is the wavelength of a light beam (e.g., a laser beam) to be used for reproducing information.

The dielectric layer has the favorable effect of adjusting reflection even when the reflective layer is not formed. In such a case, it is preferable that the dielectric layer is located on the side of the transparent substrate with respect to the recording layer. According to another preferred embodiment of the present invention, an information layer includes the dielectric layer that is deposited between the transparent substrate and the recording layer, and the dielectric layer is made of a material having a refractive index n of not less than 1.5 and has a thickness of 0.01 λ/n to 0.3 λ/n.

In the recording medium of the present invention, the number of information layers is not limited to one. For example, the recording medium can include a first information layer and a second information layer in this order from the side of the transparent substrate. Also, it can further include a third information layer, a fourth information layer, etc. to increase the recording capacity. When the recording medium has n information layers in total (n is an integer not less than 2), i.e., including at least one additional information layer, it is preferable that a separating layer is deposited between each of the information layers. The separating layer serves to separate each of the information layers optically and eliminate unnecessary optical interference.

When the recording medium has n information layers (n is an integer not less than 2), it is preferable that an information layer of the present invention is located at the position farthest from the transparent substrate among the n information layers. This is because the reflective layer limits the transmission of a laser beam. However, when the above information layer does not include the reflective layer and, e.g., the dielectric layer between the transparent substrate and the recording layer is used to achieve the conversion to a reflectance-decrease type, it is preferable that the above information layer is located at the position closest to the transparent substrate among the n information layers. This is because high transmittance can be obtained. There is no particular limitation to the configuration of an additional information layer, as long as information can be reproduced from the layer by laser beam irradiation.

Hereinafter, an embodiment of the present invention will be described more specifically with reference to the accompanying drawings.

Figure 2:
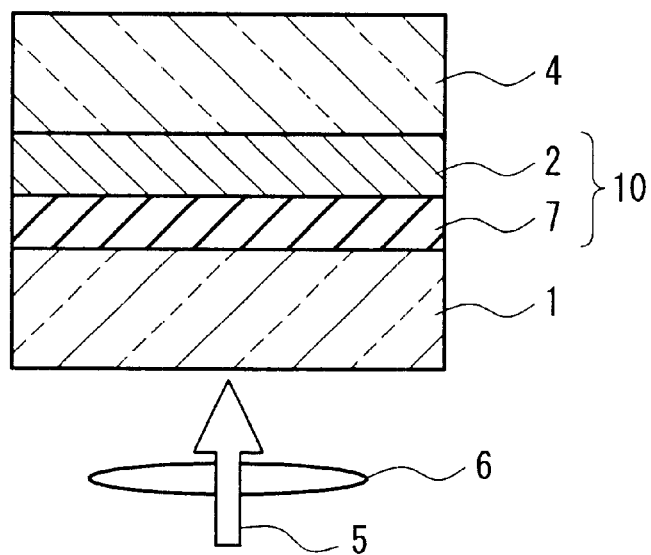
FIG. 2 is a cross-sectional view showing another example of the configuration of an optical information recording medium of the present invention.

FIGS. 1 and 2 are partial cross-sectional views, each showing an example of the configuration of a recording medium according to the present invention.

FIG. 1 shows a recording medium that includes a recording layer 2, a reflective layer 3, and a protective substrate 4 in this order on a transparent substrate 1. FIG. 2 shows a recording medium that includes a dielectric layer 7, a recording layer 2 and a protective substrate 4 in this order on a transparent substrate 1. In these media, the recording layer 2 and the reflective layer 3 function as an information layer 10, and the dielectric layer 7 and the recording layer 2 also function as an information layer 10. Each of the recording media is irradiated with a laser beam 5 focused by an objective lens 6 from the side of the transparent substrate 1, so that information is recorded on the recording layer 2 or the recorded information is reproduced therefrom. The laser beam having a wavelength of λ used for reproduction shows a relatively low reflectance when directed on the region where information is recorded.

Figure 3:
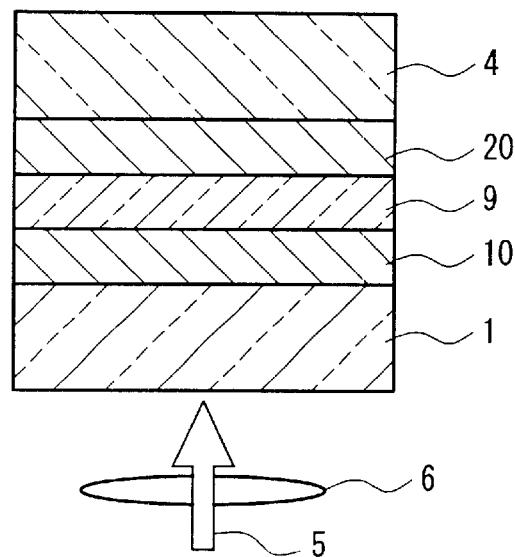
FIG. 3 is a cross-sectional view showing still another example of the configuration of an optical information recording medium of the present invention.
Figure 4:
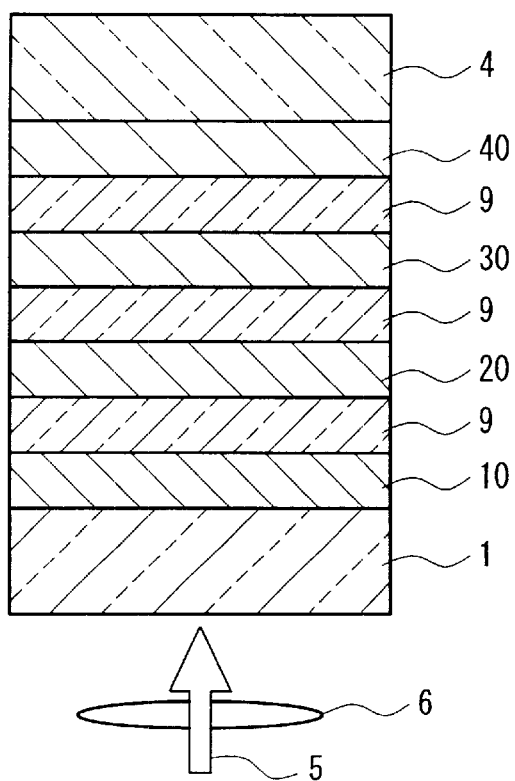
FIG. 4 is a cross-sectional view showing yet another example of the configuration of an optical information recording medium of the present invention.
Figure 5A:
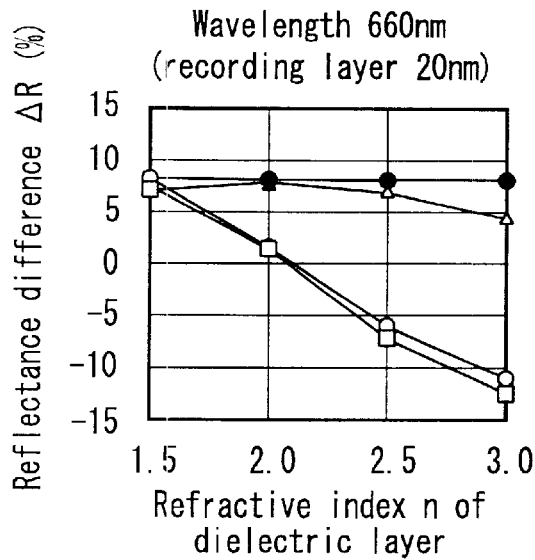
FIGS. 5A to 5D show an example of the relationship between a reflectance difference ΔR and the refractive index n of a dielectric layer for different wavelengths and thicknesses of a recording layer.
Figure 5B:
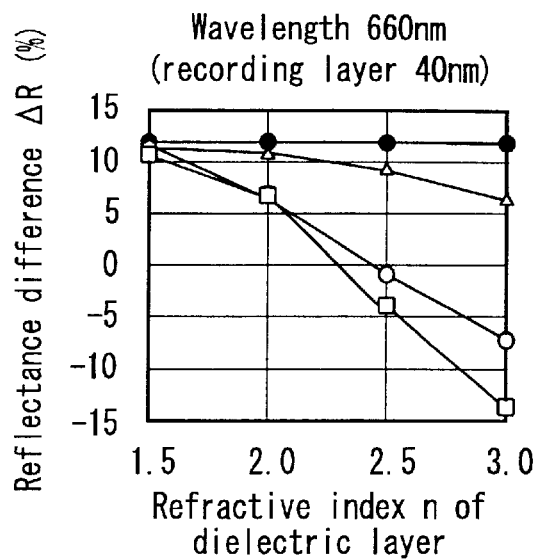
Figure 5C:
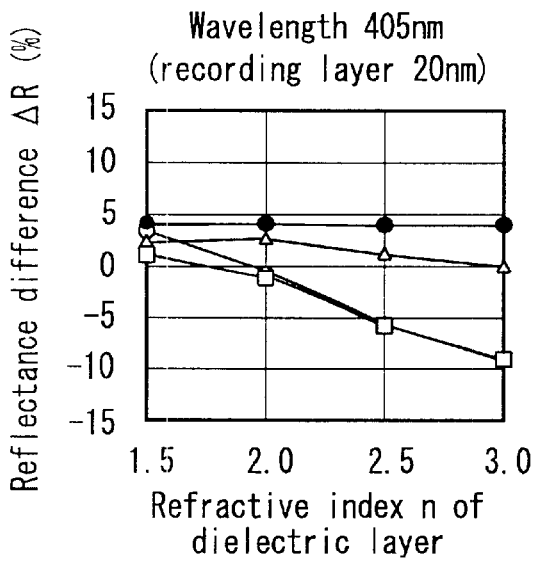
Figure 5D:
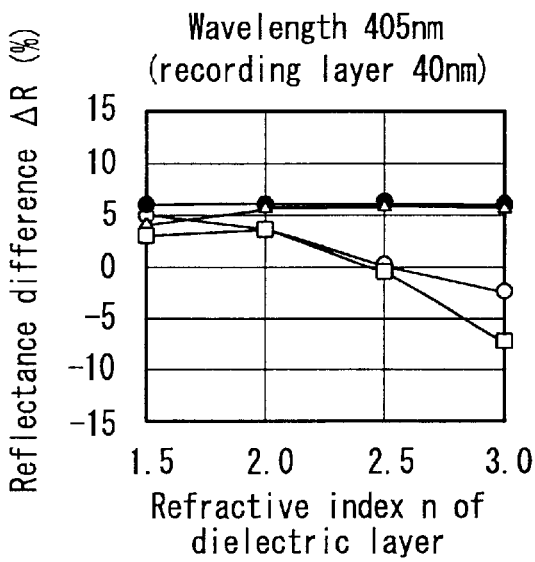

FIG. 3 shows a recording medium that includes a first information layer 10, a separating layer 9, a second information layer 20, and a protective substrate 4 in this order on a transparent substrate 1. Additional information layers may be deposited between the second information layer 20 and the protective substrate 4. FIG. 4 shows an example of a recording medium that includes a third information layer 30 and a fourth information layer 40 as the additional information layers. As shown in FIG. 4, separating layers 9 can be deposited between each of the information layers. Like the above recording media, information is recorded or reproduced also on this recording medium by focusing a laser beam 5 on a predetermined information layer through an objective lens 6 from the side of the transparent substrate 1 For the recording medium including a plurality of information layers, any one of the information layers can have the above-described characteristics.

A material substantially transparent to the wavelength of the laser beam 5 can be used as a material for the transparent substrate 1 Examples of such a material include a polycarbonate resin, a polymethyl methacrylate resin, a polyolefin resin, a norbornene based resin, an ultraviolet curable resin, glass, or an appropriate combination of these substances. There is no particular limitation to the thickness of the transparent substrate, but it is preferably about 0.01 to 1.5 mm. When the thickness is not more than 0.3 mm, the transparent substrate is suitable for recording with higher density achieved by an optical system having a high lens numerical aperture (NA).

For the recording layer 2, it is preferable to use a material that contains Te, O and M (M is an element described above) as the main component. In this specification, the main component refers to one or more than one component included in the amount of greater than 80 at %. When two or more components make up the main component, the total of those components is at least 80 at %. The preferred examples of the element M include Pd and Au. By adding Pd and/or Au, a sufficient speed for the crystallization and high durability can be achieved easily. It is preferable that the material has a composition containing oxygen atoms (i.e., O atoms) of 25 at % to 60 at % and M atoms of 1 at % to 35 at %.

When the O atoms are less than 25 at %, the heat conductivity of the recording layer may be too high, which may result in an excessively large recording mark. Therefore, even if the recording power is increased, it is difficult to raise the C/N ratio. When the O atoms are more than 60 at %, the heat conductivity of the recording layer may be too low, which may prevent the formation of a sufficiently large recording mark even if the recording power is increased. Accordingly, it is difficult to achieve a high C/N ratio and high sensitivity.

When the M atoms are less than 1 at %, the effect of accelerating the growth of Te crystals during irradiation of the laser beam may be relatively low, which may cause an insufficient crystallization speed of the recording layer 2. Therefore, it is impossible to form a mark at high speed. When the M atoms are more than 35 at %, a change in reflectance between the amorphous and crystalline states may become small, which may lower the C/N ratio.

The recording layer 2 may include elements other than Te, O and M. For example, at least one element selected from the group consisting of S, N, F, B and C can be added to the recording layer 2 for the purpose of, e.g., adjusting the heat conductivity and optical constants or improving heat resistance, environmental reliability, and the like. It is preferable that these additional elements in total account for 20 at % or less of the material of the recording layer.

It is preferable that the recording layer 2 has a thickness of 2 nm to 70 nm. This is because a sufficient C/N ratio can be obtained easily. When the thickness is less than 2 nm, sufficient reflectance and change in the reflectance may not be provided, so that the C/N ratio may be lowered. In view of this, it is more preferable that the recording layer has a thickness of not less than 5 nm. When the thickness is more than 70 nm, the thermal diffusion in the thin film surface of the recording layer may be increased, so that the C/N ratio may be lowered in high-density recording.

For the reflective layer 3, it is preferable to use a material having a refractive index n of not more than 3 and/or an extinction coefficient k of not less than 1. The preferred range of n is 2.0 or less, and that of k is 2.0 or more. Specifically, the reflective layer 3 can be formed of a metal containing Au, Ag, Cu, Al, Ni, Pd, Pt, Bi, Sb, Sn, Zn, Cr or the like, a semimetal or alloy material, or a dielectric such as TiN and ZrN.

When the reflective layer 3 is provided, its cooling ability causes the heat generated from the recording layer 2 by absorption of a laser beam to diffuse, which may reduce the recording sensitivity. Therefore, it is preferable that the reflective layer is formed of a material with a low heat conductivity. Among the above materials, a metal containing at least one element selected from the group consisting of Ni, Pd, Pt, Bi, Sb, Sn, Zn and Cr as the main component or alloy is more suitable for the reflective layer.

In the case where a dielectric layer is deposited between the recording layer 2 and the reflective layer 3, the thermal diffusion into the reflective layer is suppressed. Therefore, the recording sensitivity is not so reduced even with the reflective layer having a high heat conductivity. In this case, a material with low heat conductivity is not necessarily selected for the reflective layer 3.

The protective substrate 4 can be formed of the materials listed for the transparent substrate 1 It is also possible to use a material that is different from the transparent substrate 1, or a material that is not transparent to the wavelength of the laser beam 5. There is no particular limitation to the thickness of the protective substrate 4, but it is preferably about 0.05 to 3.0 mm.

For the dielectric layer 7, it is preferable to use a material having a refractive index n of not less than 1.5, more preferably not less than 2.0, and most preferably not less than 2.5. Specifically, e.g., a material containing ZnS, ZnS—$SiO_2$, $TiO_2$, $ZrO_2$, Si, SiC, $Si_3N_4$, GeN or the like as the main component is suitable for the dielectric layer. The preferred thickness of the dielectric layer 7 is selected so as to increase a change in reflectance and falls in the specific range described above.

When a plurality of information layers are provided, it is preferable that at least one of them includes the recording layer 2 and the reflective layer 3, or the dielectric layer 7 and the recording layer 2 in this order from the side closer to the transparent substrate. The other information layers can include a recording layer having the composition different from that of the recording layer 2. They can include not only a write-once recording layer but also a rewritable or read-only recording layer.

The separating layer 9 can be formed of an ultraviolet curable resin or the like. It is preferable that the thickness of the separating layer 9 is at least greater than a depth of focus $\Delta Z$ to reduce cross talk arising between the first information layer 10 and the second information layer 20 while either one of them is reproduced. The depth of focus $\Delta Z$ is determined by NA of the objective lens 6 and the wavelength $\lambda$ of the laser beam 5, and generally can be approximated by $\Delta Z = \lambda/\{2(NA)^2\}$ on the basis of the intensity at a focusing point, which is 80% of the intensity at a stigmatic point. For example, substitution of $\lambda = 405$ nm and NA=0.65 yields $\Delta Z = 0.479$ $\mu$m. When this optical system is employed, the separating layer 9 should have a thickness of greater than 1.0 $\mu$m because the range of ±0.5 $\mu$m is within the depth of focus. To record/reproduce information on a plurality of information layers with high density, the thickness of the separating layer 9 is set so that the distance between the information layers falls in the range over which the objective lens 6 can focus a light beam on each of the information layers. Specifically, it is preferable that the total of the thicknesses of the separating layer and the transparent substrate 1 is within the tolerance of the substrate thickness allowed by the objective lens.

Two recording media as described above can be joined together with their protective substrates 4 opposing each other, providing a so-called two-face structure. With the two-face structure, the amount of information stored per medium can be doubled further.

Each of the recording layer 2, the reflective layer 3, the dielectric layer 7, and the like can be formed by a regular vapor deposition method for producing a thin film, such as vacuum evaporation, sputtering, ion plating, CVD (i.e., chemical vapor deposition), and MBE (i.e., molecular beam epitaxy).

These thin film layers and the separating layer 9 can be deposited sequentially on the transparent substrate 1, and then the protective substrate 4 can be formed or bonded on top of that. Alternately, they can be deposited sequentially on the protective substrate 4, and then the transparent substrate 1 can be formed or bonded on top of that. The latter is suitable for the thin transparent substrate 1 having a thickness of 0.4 mm or less. In this case, it is preferable to form a concave-convex pattern, such as guide grooves for a laser beam and an address signal, on the surfaces of the protective substrate 4 and the separating layer 9 by transferring a stamper or the like on which a desired concave-convex pattern has been previously formed. When it is difficult to employ an injection method due to a small thickness of the layer, like the separating layer 9, a 2P (i.e., photopolymerization) method can be used instead.

The recording medium of the present invention allows grooves, lands between the grooves, or both the grooves and the lands to be used as recording tracks. There is no particular limitation to the space between the recording tracks, but it is preferably $\lambda/NA$ or less, particularly 0.8 $\lambda/NA$ or less, to achieve high-density recording. Here, $\lambda$ is the wavelength of a laser beam to be used for recording/reproduction and NA is the numerical aperture of a lens.

The recording medium of the present invention can provide a higher C/N ratio and a lower jitter value easily by being annealed for a predetermined time or more under the high temperature conditions. The reason for this is considered to be as follows: in the annealing process, a part of each of the atoms that disperse randomly in the recording layer is bonded properly into small crystalline nuclei, so that crystallization is performed more smoothly for recording. Thus, it is possible to form a mark with uniform edges and shape.

It is preferable that the annealing temperature, though it differs depending on the composition of the recording layer 2, ranges from 60° C. to the maximum temperature at which the transparent substrate is not melted, i.e., the softening point or the melting point thereof. For example, when the transparent substrate is formed of polycarbonate, it is preferable that the annealing temperature is 120° C. or less. According to the experiments conducted by the inventors, the annealing time, though it differs depending on the composition and annealing temperature of the recording layer, should be at least five minutes to achieve the full effect of improving the C/N ratio or the like. The recording medium can be annealed for a longer time than that. However, the recording and reproducing characteristics are not changed basically even if the annealing is continued after the full effect has been obtained.

The optical design and optical characteristics of the recording medium of the present invention will be described below. The refractive index, the extinction coefficient, and the thickness of each layer of the multi-layer film are determined. A simultaneous equation that represents the balance of light energy for each interface is established based on the law of energy conservation. By solving these equations, the reflectance and transmittance of the entire multi-layer film with respect to the incident light beam and the absorptance of each layer can be calculated (e.g., "Wave Optics" by Hiroshi Kubota, Iwanami Shoten, 1971). Using this approach, the optical calculations were performed for each of the following configurations.

The following configurations are shown with the laser beam incident side at the left side.

Configuration A: substrate/recording layer/substrate
Configuration B: substrate/dielectric layer/recording layer/substrate
Configuration C: substrate/recording layer/dielectric layer/substrate
Configuration D: substrate/dielectric layer/recording layer/dielectric layer/substrate
Configuration A': substrate/recording layer/reflective layer/substrate
Configuration B': substrate/dielectric layer/recording layer/reflective layer/substrate
Configuration C': substrate/recording layer/dielectric layer/reflective layer/substrate
Configuration D': substrate/dielectric layer/recording layer/dielectric layer/reflective layer/substrate The incident light beam had a wavelength of 405 nm or 660 nm. The optical constant n-ik of the substrate was 1.6-i0.0 at either wavelength. The optical constant of the dielectric layer was calculated with k=0.0 while varying n in the range of 1.5 to 3.0 so as to examine its dependence. Assuming that Te—O—Pd (the ratio of the number of atoms Te:O:Pd=42:53:5) was to be used, the optical constants of the recording layer were as follows: 2.5-i0.6 for the amorphous state and 2.0-i1.6 for the crystalline state at the wavelength of 405 nm; 2.5-i0.6 for the amorphous state and 3.0-i1.6 for the crystalline state at the wavelength of 660 nm. All the above values were determined by calculations based on the reflectance and transmittance of a sample measured with a spectroscope. The sample was prepared by forming a film having a thickness of about 20 nm on a quartz substrate. A sample was crystallized in an oven at a temperature of 280° C., which was in the vicinity of the crystallization temperature, for two minutes. This sample was used as the recording layer in its crystalline state. The optical constant of the reflective layer was calculated by varying n and k in the ranges of 0.5 to 4.0 and 0.5 to 8.0, respectively so as to examine its dependence.

A reflectance difference $\Delta R$ ($\Delta R = R_{cry} - R_{amo}$) caused by recording was evaluated, where $R_{cry}$ was a reflectance of the recording layer in the amorphous state and $R_{amo}$ was a reflectance of that in the crystalline state. Here, the minimum of $\Delta R$, i.e., $\Delta R_{min}$, was calculated for different wavelengths and configurations when the thickness of the dielectric layer or the reflective layer was changed arbitrarily.

For each of the configurations A, B, C and D, the refractive index n of the dielectric layer is changed when the recording layer has a thickness of 20 nm or 40 nm. FIGS. 5A to 5D show the results. In the configurations A and C, $\Delta R_{min}$ of less than zero is not obtained for any wavelength or thickness of the recording layer even if the value of the refractive index n of the dielectric layer is changed, as shown in FIG. 5. Therefore, those configurations do not act as a reflectance-decrease type. In the configuration B including the dielectric layer on the light incident side, $\Delta R_{min}$ becomes smaller with an increase in the refractive index n of the dielectric layer. Therefore, this configuration acts as the reflectance-decrease type. In the configuration D, a reflectance change substantially similar to that of the configuration B is obtained. These recording media have a larger reflectance change as the refractive index becomes higher.

Therefore, to achieve the reflectance-decrease type and provide a large reflectance change, it is preferable that at least the dielectric layer is deposited on the light incident side of the recording layer, and that the refractive index n of the dielectric layer is not less than 1.5, more preferably not less than 2.0, and most preferably not less than 2.5. On the other hand, almost no effect is achieved when the dielectric layer is provided on the side opposite to the light incident side.

Figure 6:
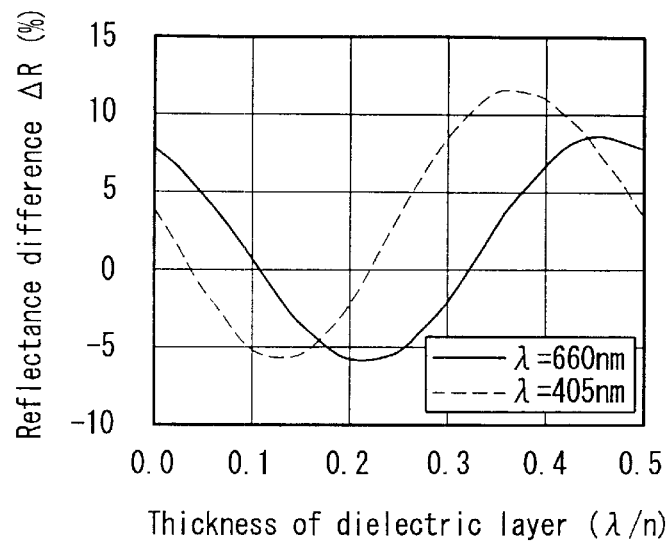
FIG. 6 shows an example of the relationship between a reflectance difference ΔR and the refractive index n of a dielectric layer.

FIG. 6 shows the film-thickness dependence of the dielectric layer on the light incident side for a reflectance difference $\Delta R$ in the configuration B. Here, the wavelength is 660 nm or 405 nm, the recording layer has a thickness of 20 nm, and the dielectric layer has a refractive index n of 2.5. FIG. 6 indicates that $\Delta R$ becomes smaller, though it differs slightly depending on the wavelength, in the range of 0.01 $\lambda$ to 0.3 $\lambda$, especially in the range of about 0.1 $\lambda$ to 0.25 $\lambda$, when the wavelength is $\lambda$ and the refractive index of the dielectric layer is n.

For each of the configurations A', B', C' and D', the refractive index n and the extinction coefficient k of the reflective layer are changed when the recording layer has a thickness of 20 nm and the dielectric layer has a refractive index n of 2.0. Table 1 shows the results.

TABLE 1

| n\k | 0.5 | 1.0 | 2.0 | 4.0 | 8.0 |
|---|---|---|---|---|---|
| Configuration A' (wavelength 660 nm) | | | | | |
| 0.5 | X | X | ○ | ⊙ | ⊙ |
| 1.0 | X | X | X | ⊙ | ⊙ |
| 2.0 | X | X | X | Δ | ⊙ |
| 4.0 | X | X | X | X | ○ |
| Configuration B' (wavelength 660 nm) | | | | | |
| 0.5 | ○ | ⊙ | ⊙ | ⊙ | ⊙ |
| 1.0 | Δ | Δ | ○ | ⊙ | ⊙ |
| 2.0 | X | X | X | ○ | ⊙ |
| 4.0 | X | X | X | Δ | ○ |
| Configuration C' (wavelength 660 nm) | | | | | |
| 0.5 | Δ | Δ | ○ | ⊙ | ⊙ |
| 1.0 | X | X | Δ | ⊙ | ⊙ |
| 2.0 | X | X | X | ○ | ⊙ |
| 4.0 | X | X | X | Δ | ○ |
| Configuration D' (wavelength 660 nm) | | | | | |
| 0.5 | ○ | ⊙ | ⊙ | ⊙ | ⊙ |
| 1.0 | Δ | Δ | ○ | ⊙ | ⊙ |
| 2.0 | X | X | Δ | ⊙ | ⊙ |
| 4.0 | X | Δ | Δ | ○ | ⊙ |
| Configuration A' (wavelength 405 nm) | | | | | |
| 0.5 | X | X | X | X | X |
| 1.0 | X | X | X | X | X |
| 2.0 | X | X | X | X | X |
| 4.0 | X | X | X | X | X |
| Configuration B' (wavelength 405 nm) | | | | | |
| 0.5 | ○ | Δ | X | X | Δ |
| 1.0 | X | X | X | X | Δ |
| 2.0 | X | X | X | X | X |
| 4.0 | X | X | X | X | X |
| Configuration C' (wavelength 405 nm) | | | | | |
| 0.5 | ⊙ | ⊙ | ⊙ | ⊙ | ⊙ |
| 1.0 | Δ | ○ | ⊙ | ⊙ | ⊙ |
| 2.0 | X | X | ⊙ | ⊙ | ⊙ |
| 4.0 | Δ | Δ | ○ | ⊙ | ⊙ |
| Configuration D' (wavelength 405 nm) | | | | | |
| 0.5 | ⊙ | ⊙ | ⊙ | ⊙ | ⊙ |
| 1.0 | ○ | ○ | ⊙ | ⊙ | ⊙ |
| 2.0 | X | Δ | ○ | ⊙ | ⊙ |
| 4.0 | Δ | ○ | ○ | ⊙ | ⊙ |

In Table 1, "⊙" represents $\Delta R_{min} < -15$, "○" represents $-15 \leq \Delta R_{min} < -10$, "Δ" represents $-10 \leq \Delta R_{min} < -5$, and "X" represents $-5 \leq \Delta Rmin$. Table 1 indicates that $\Delta Rmin$ becomes smaller, though it differs slightly depending on the configuration and the wavelength, as the refractive index n of the reflective layer decreases and the extinction coefficient k thereof increases. According to Table 1, it is preferable that the reflective layer has, e.g., n of not more than 2.0 or k of not less than 2.0, more preferably n of not more than 2.0 and k of not less than 2.0. As shown in FIG. 5, it is impossible to make $\Delta Rmin$ smaller than $-15\%$ in the configurations A to D. However, the use of the reflective layer allows $\Delta Rmin$ to be smaller than $-15\%$, as shown in Table 1.

At the wavelength of 660 nm, even the configuration A', to which only the reflective layer is added, can achieve the reflectance-decrease type with a large reflectance change. By adding the dielectric layer, like the configurations B', C' and D', the reflectance change can be increased further. At the wavelength of 405 nm, it is impossible for the configuration A' to make $\Delta Rmin$ smaller than $-5\%$. However, $\Delta Rmin$ can be decreased sufficiently at this wavelength by providing the dielectric layer on the side opposite to the light incident side, i.e., between the recording layer and the reflective layer, like the configurations C' and D'. Such wavelength dependence is considered to result from the difference in the refractive index n of crystals of the recording layer, i.e., the refractive index of crystals decreases by about 1.0 at the wavelength of 405 nm, compared with the wavelength of 660 nm.

In general, the optical constant in the amorphous state has small wavelength dependence, while the optical constant in the crystalline state often has large wavelength dependence. This tendency is significant for a material containing Te, and thus the refractive index n of crystals decreases as the wavelength becomes shorter. Therefore, $\Delta Rmin$ can be decreased sufficiently at the wavelength region (e.g., ranging from 600 to 800 nm) where the n of crystals is large, like the red wavelength region, even without adding the dielectric layer. However, $\Delta Rmin$ cannot be decreased sufficiently at the wavelength region (e.g., ranging from 350 to 450 nm) where the n of crystals is small, like the blue and purple wavelength region, unless the dielectric layer is added between the recording layer and the reflective layer. The effect of adding the dielectric layer in the blue and purple wavelength region exceeds that obtained in the red wavelength region.

Figure 7:
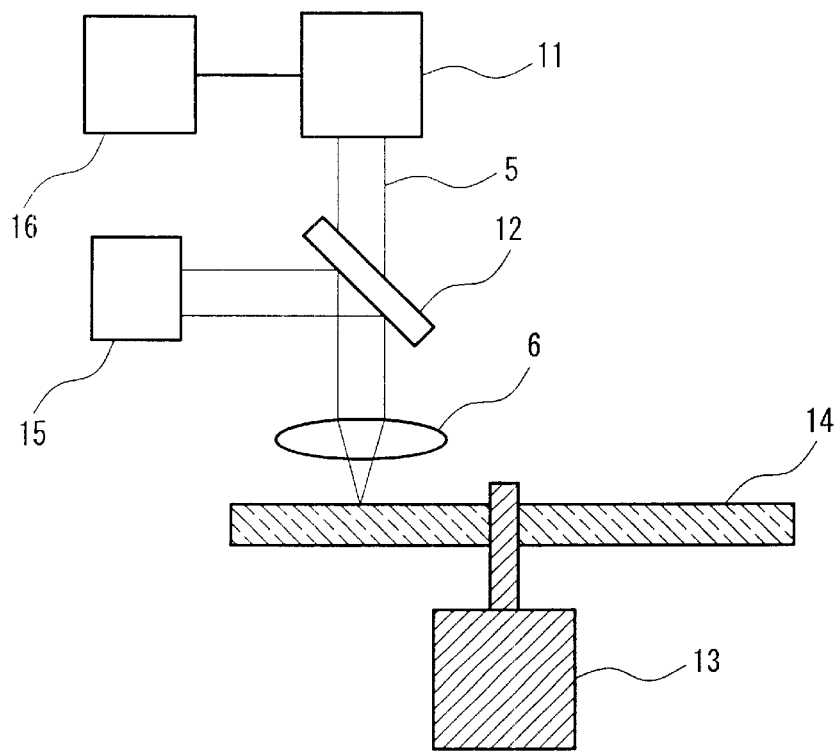
FIG. 7 shows an example of a recording apparatus for an optical information recording medium of the present invention.

FIG. 7 shows an example of a recording/reproducing apparatus. In this apparatus, a laser beam 5 emitted from a laser diode 11 passes through a half mirror 12 and an objective lens 6 and is focused on an optical disk 14 that is rotated by a motor 13, and thus information signals are recorded and reproduced. When information signals are recorded, the intensity of the laser beam 5 is modulated among a plurality of power levels. To modulate the laser intensity, a laser intensity modulation circuit 16 can be used. Specifically, the laser intensity can be modulated by modulating the driving current of a semiconductor laser. Alternatively, an electro-optical modulator, an acousto-optical modulator, or the like also can be used.

A single rectangular pulse with peak power $P_1$ may be used for a portion where a mark is formed. However, particularly when forming a long mark, it is preferable to use a recording pulse train having a plurality of pulses that is modulated between the peak power $P_1$ and the bottom power $P_3$ ($P_1 > P_3$) SO as to exclude excessive heat and make the mark width uniform. The power level is kept constant at bias power $P_2$ ($P_1 > P_2$) for a portion where a mark is not formed.

When different linear velocities of $V_1$ and $V_2$ ($V_1 < V_2$) are used respectively to form marks that are the same in physical length, it is preferable that the product of $T_1$ and $V_1$ is smaller that that of $T_2$ and $V_2$, where $T_1$ and $T_2$ are the time to emit a laser beam at the peak power $P_1$. The reason for this is as follows: if the product of $T_1$ and $V_1$ is equal to that of $T_2$ and $V_2$, the size of a mark is reduced in the case of a higher linear velocity $V_2$ because thermal interference between the marks decreases with an increase in the linear velocity.

The mark edge positions may not be uniform due to each pattern of the length of a mark, the length of a space before and after the mark, and the length of the adjacent marks, thus causing an increase of jitter. To prevent such an increase of jitter and improve the jitter rate, the above recording/reproducing method can adjust and compensate the position or length of each pulse of the pulse train so that the edge positions are uniform for each pattern, if necessary.

In reproducing the information signals thus recorded, the optical disk is irradiated with continuous light with power level Pr, and then the reflected light enters a photodetector 15, where a change in the reflected light quantity is detected as a reproduced signal.

When information is recorded or reproduced on a recording medium including a plurality of information layers as shown in FIGS. 3 and 4, it is necessary to select any one of the information layers. Therefore, a layer recognition means and a layer switching means are required, and conventionally known devices can be used as these means. The layer recognition means and the layer switching means are used also in a commercially available recording/reproducing apparatus for a read-only optical disk DVD.

EXAMPLES

Hereinafter, the present invention will be described more specifically by way of examples. However, the present invention is not limited to the following examples.

Example 1

A polycarbonate resin was used as a transparent substrate. The transparent substrate had a diameter of about 12 cm, a thickness of about 0.6 mm, a width of a groove of 0.6 μm, a width of a land of 0.6 μm, and a groove depth of about 70 nm.

A Te—O—Pd recording layer and an Al—Cr reflective layer were laminated in this order on the surface of the transparent substrate provided with grooves by sputtering. The recording layer having a thickness of about 30 nm was formed with a Te—Pd (the ratio of the number of atoms is 90:10) target. The reflective layer having a thickness of about 40 nm was formed with an Al—Cr (the ratio of the number of atoms is 98:2) target. The targets for both layers had a diameter of 100 mm and a thickness of about 6 mm. The recording layer and the reflective layer were formed under the conditions of 100 W and 500 W supplied from DC power sources, respectively. The recording layer was formed in the atmosphere of a mixed gas of Ar and $O_2$ (the flow ratio is 45:55) while maintaining the gas pressure at about 0.2 Pa. The reflective layer was formed in the atmosphere of Ar gas while maintaining the gas pressure at about 0.2 Pa. A dummy substrate was attached to the thus obtained film surface via an ultraviolet curable resin, which then was irradiated with ultraviolet rays for curing. This disk was annealed at 90° C. for about two hours, providing a disk A.

According to elemental analysis by Auger electron spectroscopy, the composition of the Te—O—Pd recording layer of the disk A was represented by the ratio of the number of atoms Te:O:Pd=42:53:5. The optical constants n-ik at a wavelength of 660 nm when the Te—O—Pd recording layer was in its amorphous state were as follows: 2.5-i0.6 for the amorphous state, 3.0-i1.6 for the crystalline state, 1.6-i0.0 for polycarbonate, and 2.0-i6.0 for Al—Cr. The calculation based on these optical constants showed that the disk of this example had Ramo=35.0%, Rcry=19.1% and ΔR=−15.9%, and that the light absorptance of the recording layer in its amorphous state was given by Aamo=40.0%.

Moreover, a disk B was produced in the same manner as that for the disk A except for the annealing process, and a disk C was produced in the same manner as that for the disk A except for the Al—Cr reflective layer. The following values were obtained by performing the same calculation as that for the disk A on the disk C: Ramo=7.4%, Rcry=18.4%, ΔR=11.0%, and Aamo=30.6%. The actual measurement of these values using a spectroscope agreed substantially with the results of the above calculation.

Using an optical system having a wavelength of 660 nm and NA of 0.6, a single signal with 9.7 MHz was recorded on the grooves and lands of each of the disks A to C while rotating the disk at a linear velocity of 8.2 m/s. The pulse waveform for recording was a single rectangular pulse that was modulated between a peak power $P_1$ and a bias power $P_2$ and had a pulse width of 25.8 ns. Here, $P_2$ was 1.0 mW and a reproduction power Pr was 1.0 mW as well. Under these conditions, the signal was recorded only once on a track in the non-recorded state, and the C/N ratio of that signal was measured with a spectrum analyzer.

The measurement showed that the disk A had a C/N ratio of 54 dB for grooves at $P_1$=10 mW and that of 52 dB for lands at $P_1$=10 mW, while the disk B had a C/N ratio of 53 dB for grooves at $P_1$=10 mW and that of 51 dB for lands at $P_1$=10 mW. Also, the disk C had a C/N ratio of 51 dB for grooves at $P_1$=12 mW and that of 50 dB for lands at $P_1$=12 mW.

As described above, a reflectance-decrease-type medium with a large absolute value of ΔR was able to be provided by including the reflective layer. In particular, a higher C/N ratio was achieved with annealing, so that Ramo became larger to increase the reflectance of a recording medium and Aamo became larger to increase the sensitivity thereof.

Example 2

A polycarbonate resin was used as a protective substrate. The protective substrate had a diameter of about 12 cm, a thickness of about 1.1 mm, a groove pitch of about 0.32 μm and a groove depth of about 20 nm.

As a second information layer, an Al—Cr reflective layer, a Zn—S dielectric layer, and a Te—O—Pd recording layer were laminated in this order on the surface of the protective substrate provided with grooves by sputtering. The reflective layer having a thickness of about 40 nm was formed with an Al—Cr (the ratio of the number of atoms is 98:2) target. The dielectric layer having a thickness of about 30 nm was formed with a Zn—S (the ratio of the number of atoms is 50:50) target. The recording layer having a thickness of about 20 nm was formed with a Te—Pd (the ratio of the number of atoms is 90:10) target. The targets for all the layers had a diameter of 100 mm and a thickness of about 6 mm. The reflective layer, the dielectric layer, and the recording layer were formed under the conditions of 500 W, 500W and 100 W supplied from a DC power source, a RF power source and a DC power source, respectively. The reflective layer and the dielectric layer were formed in an atmosphere of Ar gas while maintaining the gas pressure at about 0.2 Pa. The recording layer was formed in an atmosphere of a mixed gas of Ar and $O_2$ (the flow ratio is 45:55) while maintaining the gas pressure at about 0.2 Pa.

An ultraviolet curable resin was applied to the surface of the second information layer as a separating layer. A stamper substrate was pressed on the separating layer, which then was irradiated with ultraviolet rays for curing. The stamper substrate was formed of polycarbonate provided with grooves, having a groove pitch of about 0.32 μm and a groove depth of about 20 nm, and coated with an Al thin film. Thereafter, the stamper substrate was released to form the grooves on the separating layer.

As a first information layer, a Te—O—Pd recording layer having a thickness of about 10 nm and a Zn—S dielectric layer having a thickness of about 25 nm were laminated in this order on the separating layer in the same manner as that for the second information layer. A polycarbonate substrate having a thickness of about 0.09 mm was attached to the first information layer via an ultraviolet curable resin, which then was irradiated with ultraviolet rays for curing, resulting in a transparent substrate having a thickness of about 0.1 mm. Moreover, this disk was annealed at 90° C. for about two hours, providing a disk D.

The optical constants n-ik at a wavelength of 405 nm when the Te—O—Pd recording layer was in its amorphous state were as follows: 2.5-i0.6 for the amorphous state, 2.0-i1.6 for the crystalline state, 1.6-i0.0 for polycarbonate, 2.5-i0.0 for Zn—S, and 0.7-i4.0 for Al—Cr. The calculation based on these optical constants showed that the first information layer of the disk D had Ramo=9.6%, Rcry=2.5%, ΔR=−7.1%, Aamo=19.8%, and a transmittance of Tamo=69.6% when the recording layer was in its amorphous state, and that the second information layer had Ramo=30.8%, Rcry=4.8%, ΔR=−26.0%, and Aamo=49.8%. The actual measurement of these values using a spectroscope agreed substantially with the results of the above calculation.

Using an optical system having a wavelength of 405 nm and NA of 0.85, a single signal with 12.3 MHz was recorded on the grooves of the first information layer and the lands of the second information layer of the disk D while rotating the disk at a linear velocity of 5.0 m/s. The pulse waveform for recording was a single rectangular pulse that was modulated between a peak power $P_1$ and a bias power $P_2$ and had a pulse width of 20.4 ns. Here, $P_2$ was 1.0 mW, and a reproduction power Pr was 1.0 mW for the first information layer and 1.5 mW for the second information layer. Under these conditions, the signal was recorded only once on a track in the non-recorded state, and the C/N ratio of that signal was measured with a spectrum analyzer.

The measurement showed that the disk of this example had a C/N ratio of 50 dB for the grooves of the first information layer at $P_1$=8 mW and that of 50 dB for the lands of the second information layer at $P_1$ =10 mW. Both layers had sufficient C/N ratio and sensitivity for a practical recording medium.

The first information layer has a high transmittance of about 70%. Therefore, it is also possible to provide a recording medium including three or more information layers that can be recorded with the power of a general-purpose laser by using a plurality of information layers, each of which has the same configuration as that of the first information layer.

Example 3

A polycarbonate resin was used as a protective substrate. The protective substrate had a diameter of about 12 cm, a thickness of about 1.1 mm, a groove pitch of about 0.32 μm, and a groove depth of about 20 nm.

As a fourth information layer, an Al—Cr reflective layer, a Zn—S dielectric layer, a Te—O—Pd recording layer, and a Zn—S dielectric layer were laminated in this order on the surface of the protective substrate provided with grooves by sputtering. The reflective layer having a thickness of about 40 nm was formed with an Al—Cr (the ratio of the number of atoms is 98:2) target. The dielectric layer having a thickness of about 15 nm was formed with a Zn—S (the ratio of the number of atoms is 50:50) target. The recording layer having a thickness of about 20 nm was formed with a Te—Pd (the ratio of the number of atoms is 90:10) target. Finally, the dielectric layer having a thickness of about 15 nm was formed with a Zn—S (the ratio of the number of atoms is 50:50) target. A separating layer having a thickness of about 13 μm was formed on the surface of the fourth information layer by transferring the same groove pattern as that for the protective layer with a 2P method using an ultraviolet curable resin.

As a third information layer, a Zn—S dielectric layer, a Te—O—Pd recording layer, and a Zn—S dielectric layer were laminated in this order on the surface of the separating layer by sputtering. The Zn—S dielectric layer having a thickness of about 10 nm was formed with a Zn—S (the ratio of the number of atoms is 50:50) target. The recording layer having a thickness of about 10 nm was formed with a Te—Pd (the ratio of the number of atoms is 90:10) target. Finally, the dielectric layer having a thickness of about 30 nm was formed with a Zn—S (the ratio of the number of atoms is 50:50) target. A separating layer having a thickness of about 13 μm was formed on the surface of the third information layer by transferring the same groove pattern as that for the protective layer with a 2P method using an ultraviolet curable resin.

As a second information layer, a Zn—S dielectric layer, a Te—O—Pd recording layer, and a Zn—S dielectric layer were laminated in this order on the surface of the separating layer by sputtering. The Zn—S dielectric layer having a thickness of about 15 nm was formed with a Zn—S (the ratio of the number of atoms is 50:50) target. The recording layer having a thickness of about 8 nm was formed with a Te—Pd (the ratio of the number of atoms is 90:10) target. Finally, the dielectric layer having a thickness of about 30 nm was formed with a Zn—S (the ratio of the number of atoms is 50:50) target. A separating layer having a thickness of about 13 μm was formed on the surface of the second information layer by transferring the same groove pattern as that for the protective layer with a 2P method using an ultraviolet curable resin.

As a first information layer, a Zn—S dielectric layer, a Te—O—Pd recording layer, and a Zn—S dielectric layer were laminated in this order on the surface of the separating layer by sputtering. The Zn—S dielectric layer having a thickness of about 20 nm was formed with a Zn—S (the ratio of the number of atoms is 50:50) target. The recording layer having a thickness of about 6 nm was formed with a Te—Pd (the ratio of the number of atoms is 90:10) target. Finally, the dielectric layer having a thickness of about 35 nm was formed with a Zn—S (the ratio of the number of atoms is 50:50) target. A sheet of polycarbonate was attached to the surface of the first information layer using an ultraviolet curable resin, thus providing a transparent substrate having a thickness of 0.08 mm.

The targets for all the layers had a diameter of 100 mm and a thickness of about 6 mm. The reflective layer, the dielectric layer, and the recording layer were formed at 500 W, 500 W and 100 W supplied from a DC power source, a RF power source and a DC power source, respectively. The reflective layer and the dielectric layer were formed in the atmosphere of Ar gas while maintaining the gas pressure at about 0.2 Pa. The recording layer was formed in the atmosphere of a mixed gas of Ar and $O_2$ (the flow ratio is 45:55) while maintaining the gas pressure at about 0.2 Pa. Moreover, this disk was annealed at 90° C. for about two hours, providing a disk E.

Using an optical system having a wavelength of 405 nm and NA of 0.85, a single signal with 12.3 MHz was recorded on the grooves of each information layer of the disk E while rotating the disk at a linear velocity of 5.0 m/s. The pulse waveform for recording was a single rectangular pulse that was modulated between a peak power $P_1$ and a bias power $P_2$ and had a pulse width of 20.4 ns. Here, P2 was 0.5 mW and a reproduction power Pr was as follows: 0.5 mW for reproducing the first information layer, 0.6 mW for reproducing the second information layer, 0.7 mW for reproducing the third information layer, and 1.0 mW for reproducing the fourth information layer. The reproduction power was set so as to increase with the distance from the laser bean incident side. Under these conditions, the signal was recorded only once on a track in the non-recorded state, and the C/N ratio of that signal was measured with a spectrum analyzer.

The measurement showed that the disk E had a C/N ratio of 51 dB for the first information layer at $P_1=9.0$ mW, that of 51 dB for the second information layer at $P_1=9.5$ mW, that of 50 dB for the third information layer at $P_1=11.0$ mW, and that of 52 dB for the fourth information layer at $P_1=10.5$ mW. In this manner, it was confirmed that a recording medium having sufficient C/N ratio and sensitivity was provided even when including the multiple information layers.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical information recording medium comprising:
   a transparent substrate and
   at least one information layer formed on the transparent substrate,
   wherein the information layer comprises a recording layer made of a material comprising Te, O and M, where M is at least one element selected from the group consisting of Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi, and
   a reflectance with respect to a light beam incident from a side of the transparent substrate after recording information on the recording layer is lower than a reflectance before recording.

2. The optical information recording medium according to claim 1, wherein the information layer comprises a reflective layer on a side opposed to the transparent substrate with respect to the recording layer, and the reflective layer is made of a material having a refractive index n of not more than 3 or an extinction coefficient k of not less than 1.

3. The optical information recording medium according to claim 2, wherein the reflective layer is made of a material having a refractive index n of not more than 2.0 or an extinction coefficient k of not less than 2.0.

4. The optical information recording medium according to claim 2, wherein the reflective layer has a thickness of 5 nm to 200 nm.

5. The optical information recording medium according to claim 2, wherein the information layer comprises a dielectric layer that is provided at least at one of a position between the recording layer and the reflective layer and a position between the transparent substrate and the recording layer, and the dielectric layer is made of a material having a refractive index n of not less than 1.5 and has a thickness of 0.01 $\lambda/n$ to 0.3 $\lambda/n$, where $\lambda$ is a wavelength of a light beam to be used for reproducing information.

6. The optical information recording medium according to claim 5, wherein the dielectric layer has a thickness of 0.05 $\lambda/n$ to 0.3 $\lambda/n$.

7. The optical information recording medium according to claim 5, wherein the dielectric layer has a thickness of 0.01 $\lambda/n$ to 0.2 $\lambda/n$.

8. The optical information recording medium according to claim 2, wherein the medium comprises a total of n information layers including said information layer, where n is an integer not less than 2, and said information layer is located at a position farthest from the transparent substrate among the n information layers.

9. The optical information recording medium according to claim 1, wherein the information layer comprises a dielectric layer that is provided between the transparent substrate and the recording layer, and the dielectric layer is made of a material having a refractive index n of not less than 1.5 and has a thickness of 0.01 $\lambda/n$ to 0.3 $\lambda/n$, where $\lambda$ is a wavelength of a light beam to be used for reproducing information.

10. The optical information recording medium according to claim 9, wherein the dielectric layer has a thickness of 0.05 $\lambda/n$ to 03 $\lambda/n$.

11. The optical information recording medium according to claim 9, wherein the dielectric layer has a thickness of 0.01 $\lambda/n$ to 0.2 $\lambda/n$.

12. The optical information recording medium according to claim 9, wherein the medium comprises a total of n information layers including said information layer, where n is an integer not less than 2, and said information layer is located at a position closest to the transparent substrate among the n information layers.

13. The optical information recording medium according to claim 1, wherein the medium comprises a total of n information layers including said information layer, where n is an integer not less than 2, and a separating layer is deposited between each of the n information layers.

14. The optical information recording medium according to claim 1, wherein the recording layer contains oxygen atoms in a ratio ranging from 25 at % to 60 at % and M atoms in a ratio ranging from 1 at % to 35 at %.

15. The optical information recording medium according to claim 1, wherein the recording layer has a thickness of 2 nm to 70 nm.

16. The optical information recording medium according to claim 1, wherein a reflectance difference $\Delta R$ obtained by subtracting a reflectance with respect to the light beam before recording information on the recording layer from a reflectance after recording is lower than −5%.

17. The optical information recording medium according to claim 1, further comprising a protective substrate.

18. A method for producing the optical information recording medium according to claim 17, comprising:
    forming at least one information layer on the protective substrate, and
    forming the transparent substrate on the information layer.

19. A method for producing the optical information recording medium according to claim 1, comprising:
    performing an annealing process at a temperature of not less than 60° C. for not less than five minutes after forming at least the recording layer.

20. A method for recording information on the optical information recording medium according to claim 1, comprising:
    recording information on the recording medium that moves relative to a light beam by irradiating the recording medium with the light beam from a side of the transparent substrate while modulating the light beam between a peak power and a smaller power than the peak power so as to form a recording mark,
    wherein a product VT of a liner velocity V of the recording medium with respect to the light beam and a time T to maintain the light beam for irradiation at the peak power is determined, and the time T is set so that the product VT increases with an increase in the liner velocity V in terms of unit length of the recording mark.

21. A recording apparatus for the optical information recording medium according to claim 1 comprising:
    a rotation means for rotating the recording medium;
    an irradiation means for irradiating the medium that is rotated by the rotation means with a light beam to form a recording mark; and
    a modulation means for modulating the light beam emitted from the irradiation means between a peak power and a smaller power than the peak power,
    wherein a product VT of a linear velocity V of the recording medium with respect to the light beam and a time T to maintain the light beam for irradiation at the peak power is determined, and the modulation means sets the time T so that the product VT increases with an increase in the linear velocity V in terms of unit length of the recording mark.

22. The optical information recording medium according to claim 1, wherein the optical information recording medium is a write once optical information recording medium.

23. The optical information recording medium according to claim 1, wherein the recording layer is in an amorphous state before recording information and in a crystalline state after recording information.

* * * * *

UNITED STATES PATENT AND TRADEMARK OFFICE
CERTIFICATE OF CORRECTION

PATENT NO. : 6,768,710 B2
DATED : July 27, 2004
INVENTOR(S) : Kitaura et al.

It is certified that error appears in the above-identified patent and that said Letters Patent is hereby corrected as shown below:

Title page,
Item [56], References Cited, OTHER PUBLICATIONS, insert the following omitted reference in appropriate order -- Hiroshi Kubota, "Wave Optics", February 2, 1971, pgs. 206-214 and its partial English translation (1971). --
All "*" should be deleted except for "5,424,106 A *"

Signed and Sealed this

Tenth Day of May, 2005

JON W. DUDAS
*Director of the United States Patent and Trademark Office*